Jan. 24, 1950     O. T. BROYLES     2,495,628
AUTOMATIC SAFETY VALVE ASSEMBLY
Filed May 27, 1948
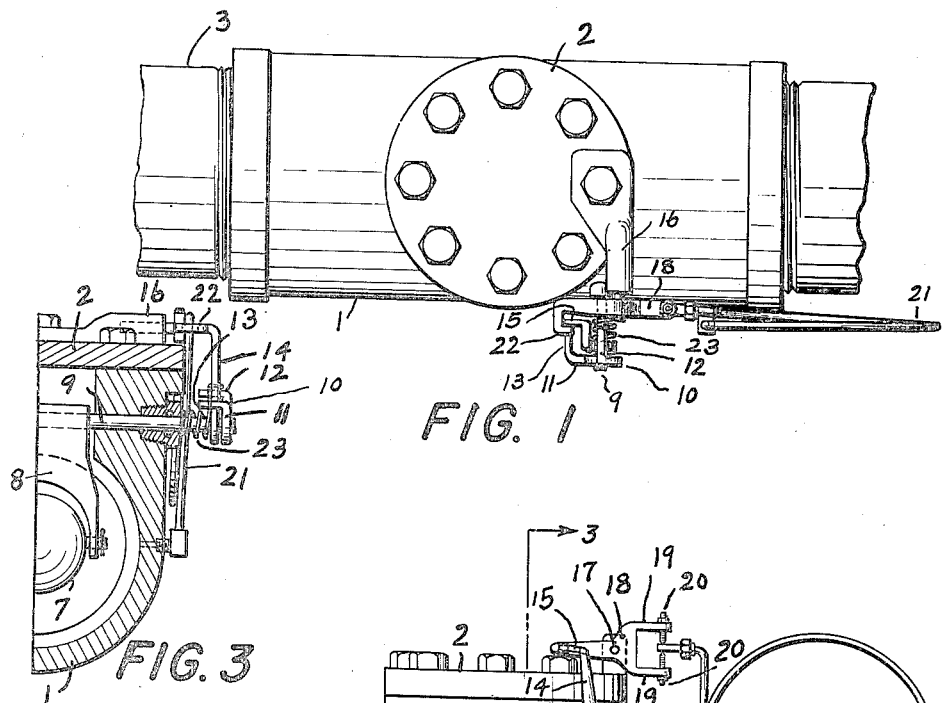
FIG. 1
FIG. 3
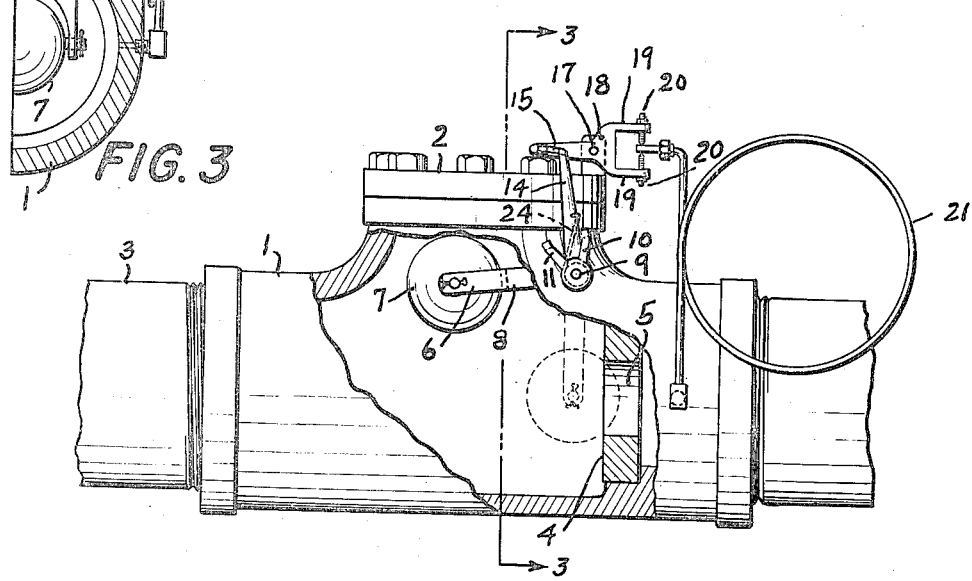
FIG. 2
Inventor
Otis T. Broyles
By
E. V. Hardway
Attorney Patented Jan. 24, 1950

2,495,628

UNITED STATES PATENT OFFICE 2,495,628

AUTOMATIC SAFETY VALVE ASSEMBLY

Otis T. Broyles, Houston, Tex.

Application May 27, 1948, Serial No. 29,469

4 Claims. (Cl. 137—153)

This invention relates to an automatic safety valve assembly.

An object of the invention is to provide a valve assembly of the character described adapted to be connected into a line for conducting fluid under pressure and which is normally held open during the normal flow of fluid through the line but which will be automatically closed should the pressure of the fluid vary beyond predetermined limits.

Another object is to provide a valve assembly wherein the main working parts are on the outside of the casing so as not to be injured by contact with the fluid flowing through the casing.

Other objects and advantages will be apparent from the following specification which is illustrated by the accompanying drawings, wherein—

Figure 1 is a plan view.

Figure 2 is a side elevation partly in section, and

Figure 3 is a fragmentary, cross-sectional view, taken on the line 3—3 of Figure 2.

Referring more particularly to the drawings the numeral 1 designates the valve casing which, in the present illustration, is provided with a removable cover 2 for access into the interior of the casing.

As illustrated this casing is connected into a fluid conducting line 3.

In the down-stream end of the valve casing there is an annular valve seat 4 having a flow passageway 5 therethrough.

There is a bifurcated valve bracket 6 wherein there is mounted a ball valve 7 which may rotate in said bracket and this bracket is formed with an extended shank 8 which is fixed on the transverse shaft 9 rotatably mounted in casing 1.

One end of the shaft 9 is extended beyond the valve casing and fixed on said extended end there is a fork having the upstanding, spaced arms 10, 11 whose free ends 12, 13 are inwardly turned and these inwardly turned ends straddle, and are spaced from, the retaining arm 14 which is loosely mounted, at one end, on the shaft 9.

The upper end of the retaining arm 14 is inwardly turned and terminates in an overturned catch 15.

Fixed on the cover 2 there is a short tangential anchor 16 whose free end is provided with an extended spindle 17 on which a yoke 18 is mounted to pivot.

One end of this yoke has the spaced arms 19, 19 and screwed through these arms and in alignment there are the screws 20, 20.

The numeral 21 designates a tube, preferably a Bourdon tube, one end of which is connected into the valve casing on the downstream side of the seat 4 and whose other end is closed and is retained between the inner ends of the screws 20, 20 so that as the pressure in the tube 21 varies the position of the yoke 18 will vary also. The other end of this yoke 18 is outwardly turned and formed with an overturned catch 22 which engages the catch 15 to hold the valve 7 in open position.

There is a coil spring 23 around the extended end of the shaft 9. One end of this spring is fixed relative to the valve casing and the other end of the spring is upwardly extended forming an arm 24 whose free end is overturned and engages behind the retaining arm 14, as shown in Figure 2.

During the normal flow of pressure liquid through the line 3 the valve 7 will be held in open position. This will be accomplished by latching the catch 15 against the catch 22 thus placing the spring 23 under tension and said arm, when in latched position, will be in engagement with the end 12 of the arm 10 of said fork thereby holding the shank 8 and the valve in elevated, or open position.

Should the pressure of the fluid flowing through the line vary said pressure will affect the Bourdon tube 21 and should pressure vary beyond selected predetermined limits, the yoke 18 will be actuated to release the catch 22 from the catch 15 and this will release the arm 14 to the influence of the spring 23. Said arm 14 will be thereby actuated into contact with the inwardly turned end 13 of the arm 11 and the shaft 9 will be thereby rotated and the valve 7, under the influence of gravity and under the influence of the spring 23 will be quickly closed so as to at once stop the flow of fluid through the line.

When it is desired to again open the valve the arm 14 may be manually latched in its original position, as shown in the figures, and when said arm is swung into latched position it will engage the overturned end 12 of said yoke and partially rotate the shaft 9 to swing the shank 8 and the valve 7 up with the valve in open position as shown in Figure 2.

The drawings and description are illustrative merely, while the broad principle of the invention will be defined by the appended claims.

What I claim is:

1. A valve assembly comprising, a valve casing adapted to be connected into a flow line, a valve seat in the down stream end of the casing, swingably mounted valve means in the casing to control the seat, a retaining arm, a pivotally mounted yoke, interengaging means between the yoke and arm retaining the arm in active position, means carried by the valve means and engaged by the arm, when in said active position, to hold the valve means in the open position, means connected to the yoke and adapted to be affected by either an increase or a decrease of the pressure of the fluid flowing through the casing and effective to release said arm, upon a variation of said pressure, to permit the valve means to close the seat.

2. A valve assembly comprising, a valve casing adapted to be connected into a flow line, a valve seat in the down stream end of the casing, swingably mounted valve means in the casing to control the seat, a retaining arm, a pivotally mounted yoke, interengaging means between the yoke and arm retaining the arm in active position, means carried by the valve means and engaged by the arm, when in said active position, to hold the valve means in the open position, means connected to the yoke and adapted to be affected by either an increase or a decrease of the pressure of the fluid flowing through the casing and effective to release said arm, upon a variation of said pressure, to permit the valve means to close the seat and yieldable means arranged to accelerate such closing movement.

3. A valve assembly comprising, a valve casing adapted to be connected into a flow line, a valve seat in the down stream end of the casing, a swingably mounted valve in the casing to control the seat, a retaining arm, a yoke pivotally mounted on the casing, interengaging means between the yoke and arm retaining the arm in active position to hold the valve open, means associated with the valve and engaged by the arm, when the arm is in active position to hold the valve open, means connected to the yoke and adapted to be affected by the pressure of the fluid flowing through the casing and effective to release the arm upon a variation of said pressure, to permit the valve to close the seat.

4. A valve assembly comprising, a valve casing adapted to be connected into a flow line, a valve seat in the down stream end of the casing, a swingably mounted valve in the casing to control the seat, a retaining arm, a yoke pivotally mounted on the casing, interengaging means between the yoke and arm retaining the arm in active position to hold the valve open, means associated with the valve and engaged by the arm, when the arm is in active position to hold the valve open, means connected to the yoke and adapted to be affected by the pressure of the fluid flowing through the casing and effective to release the arm upon a variation of said pressure, to permit the valve to close the seat and yieldable means arranged to accelerate such closing movement.

OTIS T. BROYLES.

REFERENCES CITED

The following references are of record in the file of this patent:

UNITED STATES PATENTS

| Number | Name | Date |
| --- | --- | --- |
| 819,492 | Wylie | May 1, 1906 |
| 1,305,059 | Buchel | May 27, 1919 |
| 2,037,302 | Barnett | Apr. 14, 1936 |
| 2,224,508 | Burroughs | Dec. 10, 1940 |
| 2,327,055 | McMahon | Aug. 17, 1943 |